March 30, 1965 D. C. DICKSON, JR., ETAL 3,176,201
HEAVY-BASE SEMICONDUCTOR RECTIFIER
Filed Feb. 6, 1961

INVENTORS
Donald C. Dickson, Jr.
Robert M. Bird
BY Mueller & Aichele
ATT'YS 3,176,201

HEAVY-BASE SEMICONDUCTOR RECTIFIER

Donald C. Dickson, Jr., Phoenix, and Robert M. Bird, Mesa, Ariz., assignors to Motorola, Inc., Chicago, Ill., a corporation of Illinois

Filed Feb. 6, 1961, Ser. No. 87,136
5 Claims. (Cl. 317—234)

This invention relates to semiconductor devices and a method of manufacturing them such that the parts and sub-assemblies of the device can be assembled together with a minimum of manipulation and without the use of independent jigs or fixtures.

The invention will be described herein as it is embodied in a semiconductor rectifier and a method of manufacturing it. However, the invention is not inherently limited to this particular device as will be apparent from the description which follows.

Semiconductor devices generally, as they are now provided, have at least some small parts which are difficult to handle manually at high speed. In order to produce such devices in large quantities on an economical basis, the parts should be constructed so that the device can be assembled quickly on a production line, and yet with the parts positioned accurately with respect to each other. It is particularly desirable if the parts and sub-assemblies are so constructed that they naturally assume their proper positions relative to one another as they are assembled together and stay in those positions during subsequent processing. Such a construction is referred to as "self-jigging," and this feature contributes significantly to the uniformity and reliability of the completed devices as well as providing cost savings in labor. However, a self-jigging construction has not been satisfactorily applied to the manufacture of rectifiers.

The semiconductor element, or die as it is sometimes called, is one of the smaller parts included in such devices, and the present invention is directly concerned with the positioning of this element and a lead which is connected to it during assembly of the device. In many semiconductor rectifier devices the semiconductor die is mounted on a base, and electrical connections are made to the die by one or more lead structures. If a metal base is used, the semiconductor die may be soldered to the base and to a lead simply by stacking the die and the lead together with solder preforms on the base and subsequently heating the assembly. In order for a worker to stack these elements properly on a production line where large numbers of units are manufactured at high speed, a certain amount of manual manipulation has been required, and it has sometimes been necessary to position the parts with jigs or fixtures.

It is an object of the present invention to provide a positioning structure for a semiconductor device which has a jigging function during assembly and manufacture of the device, and which is a part of the completed semiconductor device but independent of the electrical connector means for the semiconductor element.

Another object of the invention is to provide within the finished device a getter of moisture and impurities so as to reduce the effect of these substances on the semiconductor element, both during encapsulation of the device and thereafter, which getter has another function of assisting in the positioning of the semiconductor element.

Another object of the invention is to provide a semiconductor rectifier device with a mounting and enclosing structure which serves during the assembly of the device to originally position and then maintain an external lead and a semiconductor die in alignment with each other so that they can be easily assembled and connected together in a predetermined position without the use of independent jigs or fixtures.

One embodiment of the invention is illustrated in the accompanying drawings in which.

In practicing the invention in the illustrated semiconductor device a metal mounting base or heat sink is provided with an internal recess for receiving and co-operating in the positioning of the semiconductor die or element, and with cover means therefor which supports a single wire lead externally of the device and positions the same for electrical connection to the internally mounted semiconductor element. Such element is secured to the mounting base within the recess, and the cover means closes the mounting base at the opening from the recess. The wire lead with its associated connector means is electrically connected to the semiconductor element when the device is completed. Certain parts of the complete device contribute especially to a self-jigging assembly, and the method of the present invention provides a high speed, reliable manufacturing process from which uniform devices with a high degree of reliability are obtained.

Figure 3:
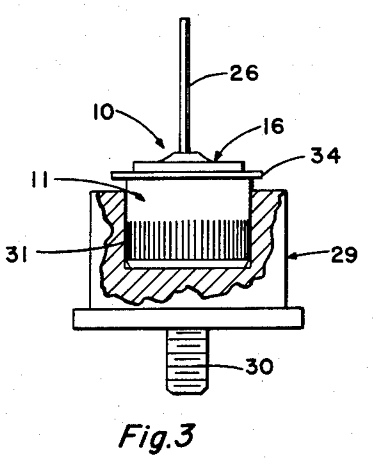
FIG. 3 is a view of the completed rectifier device which shows merely by way of illustration one way in which it can be connected to a metal mounting by means of an adaptor.
Figure 1:
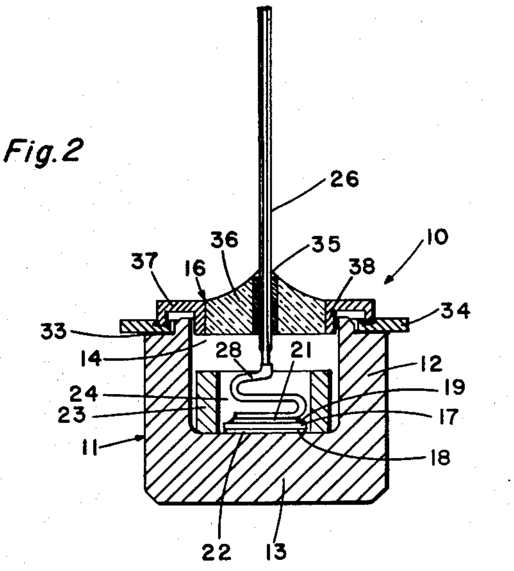
FIG. 1 is an enlarged cross-sectional view of a semiconductor rectifier device showing the parts in assembled position.

The device 10 illustrated in the drawings is a semiconductor rectifier of the type which has a silicon die, and includes a one piece heat sink member 11 having a cup-like configuration which receives or positions all the other parts of the device. The heat sink member 11 is preferably made of copper material and has a cylindrical wall 12 and an end wall 13, both of which are quite thick and therefore provide high heat conductivity and effective dissipation of heat generated within the device, as well as effective heat transfer to a mounting in the equipment to which it is ultimately applied. The originally open end of the recess 14 of the heat sink member 11 is closed in the final device as shown in FIGS. 1 and 3 by a header assembly 16. The header assembly 16 and the heat sink member 11 form a sealed enclosure for the parts provided within the device 10.

The semiconductor die or element 17 in the illustrated embodiment is of silicon, and is of the diffused junction type, with a PN junction within it. Suitable methods for fabricating such a die are well known in the art and form no part of the present invention. Metallic coatings 18 and 19 are provided on opposite faces of the die as indicated by such reference characters in FIGS. 1 and 2. These coatings are applied by known plating methods and are more receptive to solder than the silicon material itself.

Figure 2:
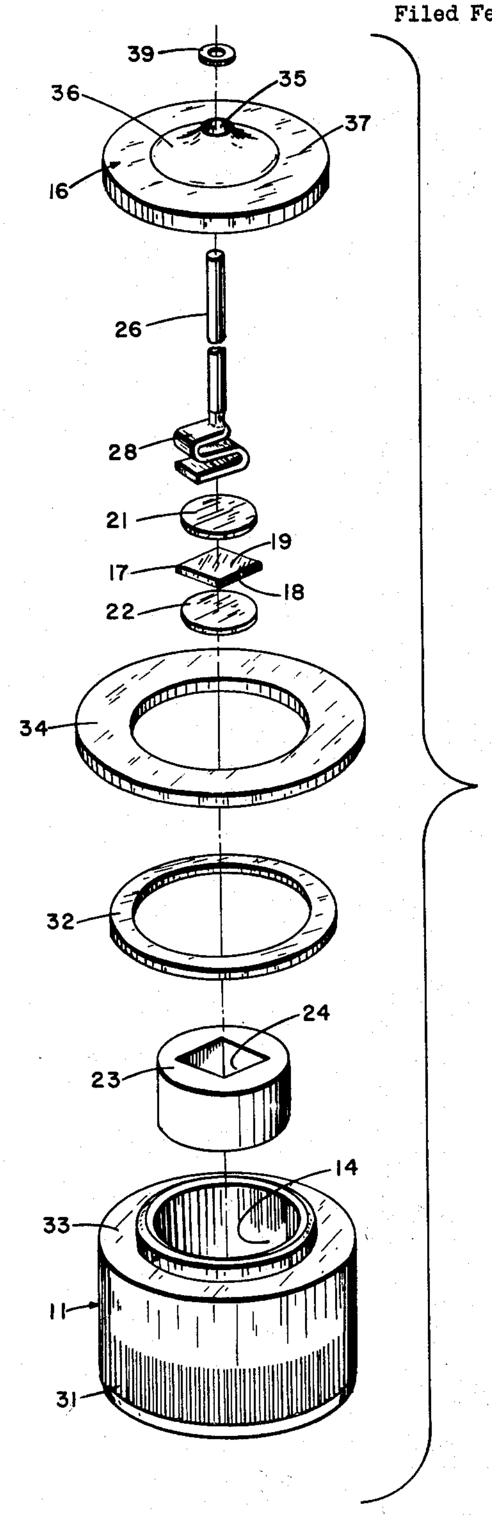
FIG. 2 is an exploded perspective view of the parts for the device of FIG. 1.

In the assembled device of FIG. 1, the die 17 is centered at the bottom of the recess 14 on the base portion 13 of the metal heat sink 11 and is mechanically secured thereto as well as electrically connected thereto by solder originally provided as a preform 22 (see FIG. 2). The centering or positioning of the die in the heat sink recess is aided by a member 23 which is dropped into the recess during assembly and before the die is placed therein as will be described. The member 23 is made of metallo-aluminosilicate material in a crystalline dehydrated form known as molecular sieve material. There are many intracrystalline voids or cavities in this material which are mutually connected by pores, and these collectively admit and adsorb gaseous moisture and impurities which would otherwise adversely affect the silicon die 17. Such gaseous agents may remain inside the device 10 after it is fabricated despite all efforts to exclude them.

However, the member 23 has a function other than the adsorption function just described. As can be seen in FIG. 2, it has a central opening or bore 24 corresponding in shape to the rectangular die 17, and this opening should be only slightly larger than the die so that the latter is readily positioned therein during assembly but centered with only practical manufacturing tolerances relative to the wire lead and connector pieces shown in FIG. 1. In this respect the member serves a positioning function in the assembly of the device without the use of external jigs, as will be explained in more detail in describing the method of the present invention.

A lead 26 extends through the cover means for the semiconductor device and is assembled by another self-jigging step in the manufacturing process. It has a flexure portion 28 at its lower end as viewed in FIG. 1, which allows for expansion and contraction of the material of the lead 26 with temperature changes, and thus prevents breakage of the die or the solder connections due to such dimensional changes. The flexure portion 28 is in the form of an S-shaped ribbon which flexes readily when the straight portion of the lead 26 expands and contracts or when force is applied to the lead. The flexure portion may have some other configuration, such as a C-shape, if desired. The heat sink 11, the solder mass 22 and the metal coating on the face 18 of the die 17 establish a heat conductive ohmic connection to the die on one side of the junction within it. The lead member 26, the solder mass 21, and the metal coating on the face 19 of the die 17 establish a heat conductive ohmic connection to the die on the other side of the rectifying junction within it.

The heavy closed bottom construction of the cylindrical walled heat sink 11 makes it possible to insert this latter member into a metal receptacle or adaptor 29 in the manner illustrated in FIG. 3. The outer surface may be knurled as shown in FIGS. 2 and 3 at 31 so as to provide a tight and firm fit between the heat sink and the adaptor 29 which receives it, and the adaptor has a threaded stud 30 which may be used as a bolt to secure the device to a mounting, normally in the equipment in which the rectifier is to be used. The semiconductor device 10 may alternatively be pressed in the same manner directly into a cavity in the mounting itself.

More in particular as to the configuration of the ring or body 23, it is shown with an opening of a rectangular or square configuration in FIGS. 1 and 2. This particular shape is not critical, but it is significant that the opening is only slightly larger than the die 17. The opening 24 may be round, and if a square die is used, the diameter of the opening should be only slightly larger than the diagonal dimension of the die. A round die may be used with either a square or a round opening in the body 23. Because of the relation between the size of the opening 24 and the size of the die, the body 23 readily accepts and aids in locating the solder bodies 21 and 22, the die 17 and the flexure portion 28 of the lead 26 when these elements are assembled in the heat sink. Thus, the internal bore of the member 23 guides these elements as they are assembled and helps to maintain them in alignment with each other until they are permanently connected together by melting and then solidifying the solder. The member 23 is itself retained by the walls of the recess 14 of heat sink 11.

The device 10 is so constructed that it can be assembled in an economical, and logical manner with all pieces falling into place without independent jigging. The assembly method will be described primarily with reference to FIG. 2. First, a ring 32 of brazing material is seated on the shoulder 33 at the top of the heat sink, and a steel washer 34 is placed on the ring 32. The resulting assembly is passed through a furnace at a temperature of about 800° C. to form a brazed connection between the adjacent surfaces of the washer and the heat sink.

This sub-assembly is placed in the assembly line in an upright position with the open end of the recess 14 at the top. The hollow member 23 is placed on the bottom of the recess in the heat sink, and fitting fairly closely with the annular wall within such recess. There is a clearance of a few thousandths of an inch so that the opening or bore 24 is approximately centered axially of the heat sink. The member 23 need not be secured to the heat sink. The solder disc 22, the silicon die 17, and the other solder disc 21 are then stacked vertically in the order named at the bottom of the recess and against that face of the end wall 13 of the heat sink, and within the bore 24. The member 23 readily accepts the stacked parts just described, and helps to position the parts and maintain them in the proper stacked relation.

The lead 26 is inserted through the eyelet 35 in a glass or insulating portion 36 of the header, and a solder ring 39 is dropped over the lead onto the header 16. This assembly is then placed on the heat sink with the flexure portion 28 of the lead in contact with the solder disc 21. A steel ring 37 of the header has a flange portion 38 which fits inside the upper end of the heat sink member 11 as shown in FIG. 1. The header is retained in position by this placement and serves to hold the lead member 26 in alignment with the die and solder discs. The fit between the flange portion 38 of the header and the inner wall of the heat sink is sufficiently close that the lead 26 is positioned and maintained right at the axis of the device. The weight of the lead member 26 helps to hold the die 17 and the solder bodies 21 and 22 against the bottom of the heat sink so that all of the surfaces to be soldered together are maintained in firm contact.

Furthermore, in this manner the wall around the recess of the heat sink 11 serves to position the member 23 and maintain it in position during assembly. The latter in turn does the same for the die and solder discs. As was just pointed out, the shoulder of the recess 14 positions the header 16 which in turn positions and maintains in position the lead 26 for connection to the die.

The complete assembly as just described is passed through a furnace and heated to a temperature sufficient to melt the solder parts 21, 22 and 39 so that the die 17 is soldered to the flexure portion 28 of the lead and also to the end wall 13 of the heat sink, and the straight portion of the lead is soldered to the eyelet 35. Any vapors and gases produced in the device during the soldering can rise to the top of the device and escape through the unsealed joint between the header and the heat sink at the top of the device, and some of these are adsorbed by the body 23.

The header assembly 16 is then welded to the washer 34. The welding is accomplished by pressing a welding head against the ring 37 and applying current to it, thereby effecting a current weld between the header and the washer 34. The shoulder at the top of the heat sink and the portion of the header which projects into the heat sink tend to block any impurities which are splashed or sprayed by the welding such that they cannot directly enter the enclosure. However, some gaseous moisture and other impurities may be introduced, and the concentration of these impurities is reduced by the member 23 which adsorbs them.

The self-jigging nature of the assembly is believed to be apparent from the foregoing description. The importance of this is partly due to the small size of the parts of the device, and such small parts are typical in semiconductor devices. In general the parts have dimensions ranging from about an inch down to a few thousandths of an inch, or even less in some devices.

The dimensions of a practical embodiment of the device of FIGS. 1 to 3 are presented in the following table.

| | Dimensions, inches |
|---|---|
| Over-all device 10: | |
| Container height | .39 |
| Length of exposed lead | .69 |
| Maximum diameter | .62 |
| Heat sink 11: | |
| Height | .315 |
| Inside diameter | .312 |
| Outside diameter | .495 |
| Wall thickness 13 | .085 |
| Hollow body 23: | |
| Outside diameter | .290 |
| Inside dimensions square | .15 |
| Height | .130 |
| Die 17: | |
| Sides | .125 x .125 |
| Thickness | .0075 |

It should be noted that the positioning function and the gettering function of the hollow body or member 23 are distinct from each other although they are advantageously incorporated in a single element in the illustrated embodiment. The positioning function can be accomplished equally as well by a hollow body which is not made of molecular sieve material. The material of such a body should be electrically insulating, or at least not highly conductive, in order to prevent shorting of the junction in the die 17 at its periphery. It is only necessary for the positioning structure for the die to be sufficiently insulating as to not adversely affect the desired electrical characteristics of the semiconductor die in operation of the device. This means that it should have a considerably higher resistivity than the semiconductor material of the die 17. The positioning of the lead which is provided by the header 16 and the heat sink 11 is significant because it means that all soldering can be accomplished in a single heating cycle, and it is not necessary to use jigs to hold the lead in alignment with the die.

We claim:

1. A semiconductor device including in combination, a meal base member having a bottom wall and an annular side wall forming a recess in the base opening at the top of said annular side wall, a semiconductor unit centered at the bottom of said recess and secured to said bottom wall, means for closing the base opening and sealing the device at the base opening, said means including a welding ring secured to the top of said annular side wall around said opening, and a cover over said base opening including an annular metal ring having central opening therein and insulating material in said central opening, said annular metal ring having an inner annular rim portion extending downwardly into the base recess, and said annular metal ring further having a web portion extending radially outward from said inner annular rim over at least a part of the radial width of said welding ring, with one of said two rings having a circular projecting portion outside said base opening extending to the other said ring and welded thereto, said projecting portion being narrower in its dimension between said rings than the corresponding dimension of said inner annular rim measured from the bottom of said web into said base recess, and stiff lead means extending upwardly from said semiconductor unit through said insulating material of said cover and supported in a centered position within said base opening by said insulating material.

2. A semiconductor device including in combination, a metal base member having a bottom wall and an annular side wall forming a recess therein opening at the top of said side wall, a semiconductor unit secured to a central portion of said bottom wall, stiff lead means extending from said semiconductor unit centrally of said annular side wall and out of said base opening, and means for closing and sealing said base opening and supporting the stiff lead means therein comprising a first steel ring secured to the top of said annular side wall around said base opening, and a cover over said base opening including a second steel ring having a central opening therein with insulating material in said central opening supporting said lead means, said second steel ring having an inverted U-shape in cross-section and comprising an inner annular rim portion having an inside diameter less than the inside diameter of said base-recess-annular-side wall, a web portion extending radially outward from said inner annular rim portion over at least part of the radial width of said first steel ring, and an outer annular rim portion extending downwardly from said web portion to said first steel ring and welded thereto, said inner annular rim portion extending from the bottom of said web portion a greater distance than the corresponding dimension of said outer annular rim from the bottom of said web portion to said first steel ring.

3. A semiconductor device including in combination, a metal base member having a bottom wall and an annular side wall forming a recess in the base opening at the top of said annular side wall, a ring-shaped member resting on said bottom wall having a longitudinal bore entirely through the same and performing getter and piece positioning functions in the device, a semiconductor unit within the bore of said ring-shaped member and secured to a central portion of said bottom wall, means for closing the base opening and sealing the device at the base opening, said means including a welding ring secured to the top of said annular side wall around said opening, and a cover over said base opening including an annular metal ring having a central opening therein and insulating material in said central opening, said annular metal ring having an inner annular rim portion extending downwardly into the base recess, and said annular metal ring further having a web portion extending radially outward from said inner annular rim over at least a part of the radial width of said welding ring, with one of said two rings having a circular projecting portion outside said base opening extending to the other said ring and welded thereto, said projecting portion being narrower in its dimension between said rings than the corresponding dimension of said inner annular rim measured from the bottom of said web into said base recess, and stiff lead means extending upwardly from said semiconductor unit through said insulating material of said cover and supported in a centered position within said base opening by said insulating material.

4. In a semiconductor device having a metal base with a recess therein opening at the top of said base and having an annular rim surrounding the opening at the top, the combination of pieces in and on said base to complete said device, said pieces including a ring-shaped member of high resistivity material resting on the bottom of the base recess with a wall forming a longitudinal bore entirely through the same performing getter and piece-positioning functions in the device, a semiconductor element centered in the bore of the ring-shaped member at the bottom of the base recess and secured to the base at said bottom, a stiff metal lead member centered over the central portion of said semiconductor element in a stacked position therewith and electrically and mechanically connected thereto, with said stiff lead member being centered in the base-recess-opening and extending directly upwardly out of the base, a metal welding ring secured to the annular rim on the metal base, and a cover for the recess-opening in the base comprising an annular metal ring having an opening centrally thereof with the stiff lead member extending therethrough, insulating means filling said latter opening and supporting the stiff metal lead member in the centered position therein, and with said annular metal ring including an integral flange extending radially outwardly from the opening in the annular metal ring to a position over a portion of the metal welding ring and secured thereto by a welded joint so as to hermetically seal the recess of the base at the top opening.

5. In a semiconductor device having a metal base with a recess therein opening at the top and having an annular rim surrounding the opening at the top, the combination of pieces in and on said base to complete said device, said pieces including a ring-shaped member resting on the bottom of the base recess with a wall forming a longitudinal bore entirely through the same performing getter and piece-positioning functions in the device, a semiconductor element centered in the ring-shaped member at the bottom of the base recess and secured to the base at said bottom, a stiff metal lead member having an S-shaped bend at the bottom end thereof within the bore of the ring-shaped member centered over the central portion of said semiconductor element in a stacked position and electrically and mechanically connected thereto, with said stiff lead member having an upstanding body portion centered in the base-recess-opening and extending directly upwardly out of the base, a metal welding ring secured to the annular rim on the metal base, and a cover for the recess-opening in the base comprising an annular metal ring having an opening centrally thereof with the stiff lead member extending therethrough, insulating means filling said latter opening and supporting the stiff lead member at the upstanding body portion in the centered position therein, and with said annular metal ring including an integral flange extending radially outwardly from the opening in the annular metal ring to a position over a portion of the metal welding ring and secured thereto by a welded joint so as to hermetically seal the recess of the base at the top opening and maintain the lead member in a position adapted to permit the device to be electrically connected into a circuit.

References Cited by the Examiner

UNITED STATES PATENTS

| | | | |
|---|---|---|---|
| 2,178,969 | 11/39 | Ruben | 317—234 |
| 2,762,001 | 9/56 | Kilby | 317—235 |
| 2,806,187 | 9/57 | Boyer et al. | 317—235 |
| 2,830,238 | 4/58 | Gundmundsen | 317—234 |
| 2,837,703 | 6/58 | Lidow | 317—234 |
| 2,897,419 | 7/59 | Howland et al. | 317—234 |
| 2,898,668 | 8/59 | Knott et al. | 29—25.3 |
| 2,900,701 | 8/59 | Coggins | 29—25.3 |
| 2,906,932 | 9/59 | Fedotowsky et al. | 317—240 |
| 2,921,244 | 1/60 | Emeis | 317—234 |
| 2,945,992 | 7/60 | Bollert et al. | 317—234 |
| 2,946,935 | 7/60 | Finn | 317—234 |
| 2,993,153 | 7/61 | Wagner | 317—234 |
| 3,030,558 | 4/62 | Berg et al. | 317—234 |

References Cited by the Applicant

| | | |
|---|---|---|
| 3,005,867 | 10/61 | Green et al. |
| 3,010,057 | 11/61 | Albert. |
| 3,015,760 | 1/62 | Weil. |
| 3,025,435 | 3/62 | Green. |
| 3,065,390 | 11/62 | Boswell et al. |
| 3,089,067 | 5/63 | Baird. |

FOREIGN PATENTS

| | | |
|---|---|---|
| 1,214,645 | 4/60 | France. |

DAVID J. GALVIN, *Primary Examiner.*

SAMUAL BERNSTEIN, JAMES D. KALLAM, *Examiners.*